United States Patent [19]

Oliver

[11] Patent Number: 4,904,090
[45] Date of Patent: Feb. 27, 1990

[54] TEMPERATURE SENSING ARRANGEMENT

[75] Inventor: Colin C. Oliver, Slough, England
[73] Assignee: Thorn EMI plc, London, England
[21] Appl. No.: 125,991
[22] Filed: Nov. 27, 1987

[30] Foreign Application Priority Data

Nov. 29, 1986 [GB] United Kingdom ............... 8628610

[51] Int. Cl.[4] .................... G01J 5/32; H01L 27/14
[52] U.S. Cl. .................... 374/124; 236/94;
374/11; 374/133; 374/141; 374/129
[58] Field of Search ........... 374/129, 124, 20, 10,
374/11, 141; 236/46 R; 136/225

[56] References Cited

U.S. PATENT DOCUMENTS

| | | | |
|---|---|---|---|
| 4,066,365 | 1/1978 | Staunton | 62/3 X |
| 4,078,179 | 3/1978 | Everest | 250/338.1 |
| 4,106,690 | 8/1978 | Tomlinson | 236/46 R |
| 4,301,682 | 11/1981 | Everest | 374/133 X |
| 4,345,455 | 8/1982 | Hayes, Jr. | 374/20 |
| 4,456,390 | 6/1984 | Junkert et al. | 374/128 |
| 4,456,919 | 6/1984 | Tomita et al. | 136/225 X |
| 4,472,594 | 9/1984 | Ishida | 136/225 X |
| 4,583,814 | 4/1986 | Koetser | 374/161 X |
| 4,722,612 | 2/1988 | Junkert et al. | 374/124 |

FOREIGN PATENT DOCUMENTS 2067292 7/1981 United Kingdom ............. 374/20

Primary Examiner—Daniel M. Yasich
Attorney, Agent, or Firm—Fleit, Jacobson, Cohn, Price, Holman & Stern

[57] ABSTRACT

A temperature sensor is incorporated within a housing having a silicon window through which infra-red radiation can enter. Mounted on a support structure is a semiconductor fabrication consisting of a reference junction and a sensing junction, covered with a black absorber. The reference junction is responsive to the temperature of the housing, whereas the sensing junction is responsive to the temperature of the housing and also the temperature of a remote zone from which infra-red radiation can enter the housing via the window. A Peltier heater/cooler controls the temperature of the housing, which temperature is monitored by a sensor to provide a measure of that of the remote zone.

7 Claims, 4 Drawing Sheets

TEMPERATURE SENSING ARRANGEMENT

This invention relates to temperature sensing arrangements and it relates especially, though not exclusively, to such arrangements for use in circumstances where a relatively uniform temperature prevails over a relatively large area. Sensing arrangements in accordance with the invention are particularly suitable for use in the domestic environment, and may be used as part of an automated environmental control system.

In circumstances where it is necessary to utilise a number of temperature sensors, for example in an automated environmental control system for a house, it is highly desirable to avoid the need for electrical cabling to interconnect all sites at which temperature monitoring is required. It would be possible, of course, to use battery operated sensors, but the difficulty then arises that long battery life is called for and this is difficult to achieve with economy.

According to the invention there is provided a temperature sensing arrangement including a temperature sensor device incorporating, in a housing, a reference sensor monitoring the temperature of the housing and a further sensor monitoring the temperature of a zone remote from the housing, control means for controlling the temperature of said housing, a circuit arrangement responsive to the sensors and effective to drive said control means in a sense tending to cause the temperature of said housing to approach that of said zone and means for monitoring the temperature of said housing, thereby to derive an indication of the temperature of the zone.

By this means, the sensing arrangement can be mounted in a location which is convenient for cabling (for example, on a ceiling) and yet can monitor accurately the temperature of a remote zone (say a region of wall) to which it would be inconvenient to connect cables. Indeed, if suitable optical and/or mechanical scanning means are incorporated in the arrangment, a single arrangement can be used to monitor the temperature of several zones.

Preferably, the arrangement comprises means to vary the drive operation of the circuit arrangement in accordance with the operation of the sensors. Thus, there may be provided means to monitor the output of the further sensor to determine if it exceeds a predetermined threshold and means to effect correction of the operation of the control means in response to the sensor monitor means.

Preferably, the arrangement comprises means to render the heating and cooling cycles approximately equal in duration. Thus there may be provided means to monitor the duration of the heating cycle and the cooling cycle, and means to vary the heating and/or cooling current in response to the cycle-monitor means. The housing may comprise a silicon windows, and/or the control means may comprise a Peltier heater/cooler device.

In order that the invention may be clearly understood and readily carried into effect, one embodiment thereof will now be described, by way of example only, with reference to the accompany drawings of which:

Figure 1:
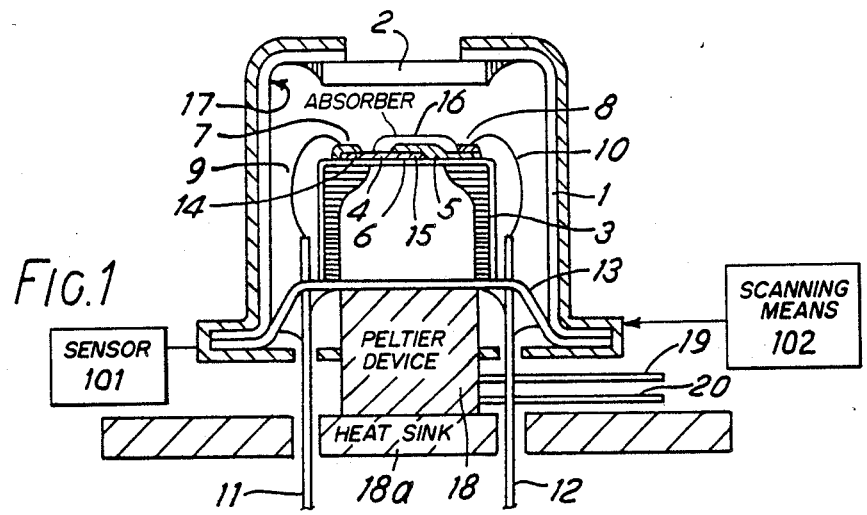
FIG. 1 shows a sensor device for use in an arrangement in accordance with one example of the invention.

Referring now to FIG. 1, a temperature sensor device is incorporated within a housing 1 which may, for example, be circular or rectangular in plan. The housing 1 has a window 2 through which infra-red radiation can enter and the window is preferably formed of silicon, though a metallic mesh or grid can be used if desired.

Inside the housing 1, mounted on a conventional support structure 3, is a semiconductor fabrication consisting of a p-type film 4 and an n-type film 5 on an oxide film 6 provided on the support structure. Respective contacts 7, 8 are made to the semiconductor fabrication in conventional manner and connections 9, 10 are made from these contacts to respective output pins 11, 12 again as is conventional. The base of the housing is closed by a header 13 which provides a base for the support structure 3.

The semiconductor fabrication together with the relevant contacts provide a reference "cold" junction 14 and a sensing "hot" junction 15, the latter being covered with a black absorber 16. However, in operation, the "hot" junction 15 can be colder than the "cold" junction 14, depending on whether the local ambient is higher or lower than the average room temperature. Junction 14 is rendered responsive to the temperature of the housing 1, whereas junction 15 is responsive to the temperature of the housing and also the temperature of a remote zone from which infra-red radiation can enter the housing 1 via window 2. In order to prevent infra-red radiation entering the housing 1 by traversing window 2 at low angles and being reflected on to the black absorber 16 associated with the "hot" junction 15, the inside of the housing 1 is preferably blackened, as indicated at 17.

The purpose of the window is twofold. Firstly, it ensures that the air within the housing is at the same temperature as the housing, as it would affect the temperature of the junction which receives the external radiation. If the sensor were in a locally high ambient temperature, a metallic mesh would be less effective than, say, a silicon window in keeping the enclosed air at the same temperature as the housing. Secondly, it reduces the effect of sunlight and also tungsten lights, if used, on the sensed "average" temperature. To this end silicon or germanium windows, for example, cut out wavelengths below about 1 micron to 2 microns. It is however also possible to use other materials for the window.

Attached to the header 13 is a Peltier heater/cooler device 18, having a heat sink 18a and associated power leads 19, 20, for controlling the temperature of the housing 1. It is preferable to surround the housing 1 with thermal insulation in order to reduce the demands on the Peltier device.

The temperature of the housing 1 is monitored by any convenient form of electricaltemperature sensor indicated schematically as 101.

Figure 2:
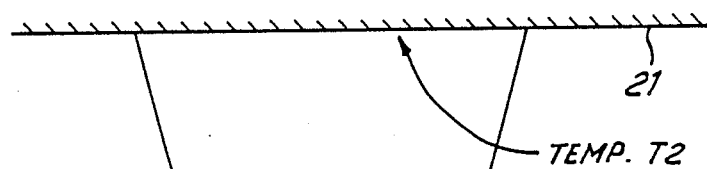
FIG. 2 shows a schematic layout of an arrangement utilising the device of FIG. 1.
Figure 2:
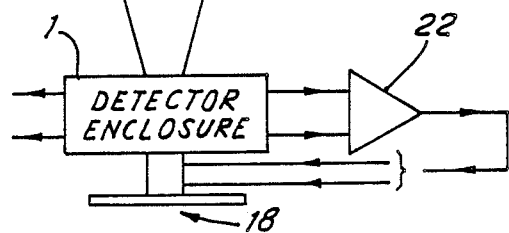

Referring now to FIG. 2, it is assumed that the window 2 in the housing 1 will admit to the black absorber 16 associated with the "hot" junction 15, infra-red radiation from a zone on a wall 21 which is assumed to be at a temperature $T_2$. In a practical case, when the emissivity of the wall is not 1, the effective temperature $T_2$ would be determined by the wall temperature and the energy from the surrounding room and contents reflecting off of the wall into the sensor. In fact, the final sensor configuration might be such that a 360° view of the room is obtained so as to obtain a better average temperature and so as to be less effected by localised 'hot' spots e.g. human bodies, heat generating equipment etc.

If it is assumed that the local ambient temperature in the vicinity of the housing 1 is $T_1$, the "cold" junction 14 initially senses this temperature and thus an output indicative of the difference $T_2-T_1$ can be derived from the sensor device constituted by the junctions 14, 15. This output is utilised, by way of a feedback amplifier 22, to drive the Peltier device 18 in a sense tending to cause $T_1$ to approach $T_2$. The temperature of the housing 1 is monitored by the aforementioned electrical temperature sensor to provide an indication of the temperature $T_2$.

Figure 3:
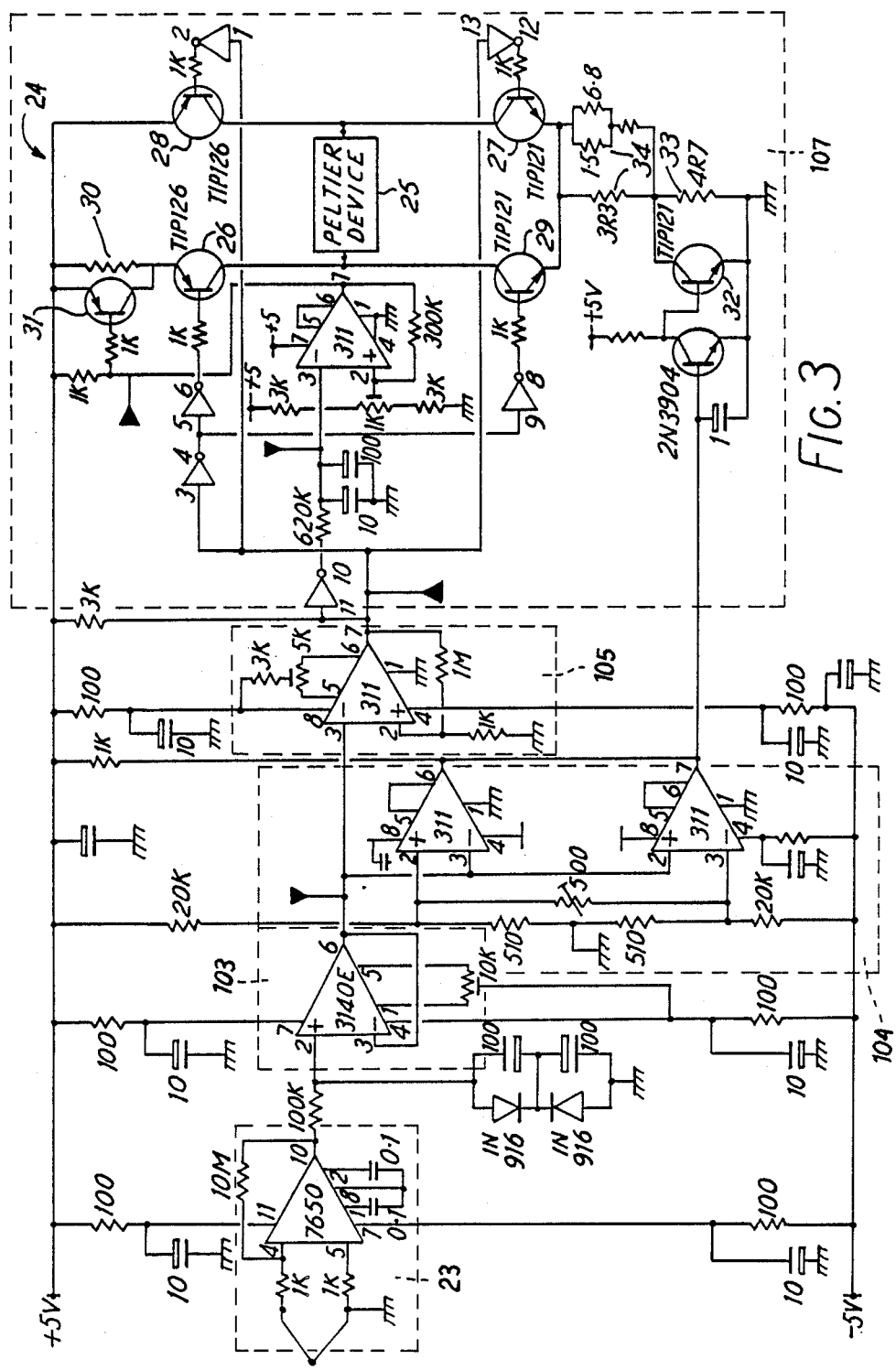
FIG. 3 shows a circuit arrangement for use with the device of FIG. 1.

FIG. 3 shows an electrical circuit arrangement for use with the device shown in FIG. 1. The "hot" and "cold" sensors of the device 1 are coupled to the positive and negative inputs respectively of a high gain chopper amplifier 23. The differential temperature signal so developed is applied, by way of a further amplification and stage 103 and comparator stages 104, 105, to a Peltier device drive circuit 107 including a four transistor switch arrangment 24 designed to control the supply of current to the Peltier device 25. Transistors 26 and 27 of the arrangement 24 are rendered conductive to cause the Peltier device 25 to heat the housing 1 (FIG. 1) and transistors 28 and 29 are rendered conductive to cool it.

It has been found, in practice, that the circuit controlling the Peltier device can overcorrect. To reduce this overcorrection the circuit of FIG. 3 includes resistors 33 and 34; resistor 33 may be shorted out by transistor 32. When the output from the sensor thermocouple is small, resistors 33 and 34 are in circuit, but if the output exceeds a certain threshold, resistor 33 is shorted out and the amount of correction is increased.

Another problem arises when the local ambient temperature is much higher than the average temperature of the room (this could arise if the sensor were positioned above, say, a tungsten lamp). In these circumstances the heating cycle is shorter than the cooling cycle and this in turn causes the average temperature of the housing (equivalent to the indicated average room temperature) to be higher that the actual average room temperature. Circuit 34 in conjunction with transistor 31 and resistor 30 compensate for this effect and tend to make the heating and cooling cycles approximately equal in duration. If the heating cycle is shorter than the cooling cycle, transistor 31 is switched off and resistor 30, in the heating part of the bridge circuit, reduces the heating current compared with the cooling current thus making the heating cycle more equal in duration to the cooling cycle. The average housing temperature then follows more accurately the average room temperature. It should be noted that a similar circuit could be placed in the cooling part of the bridge circuit to allow for those cases when a sensor is placed in a position where the local ambient temperature is much lower than the average room temperature.

Figure 4:
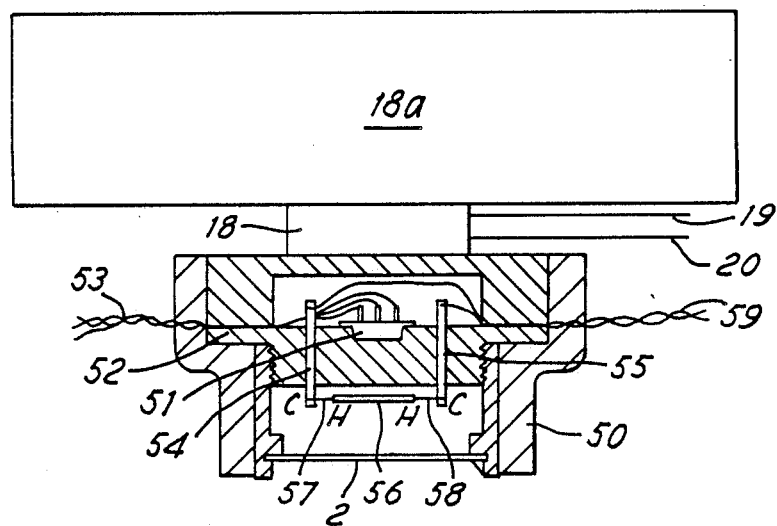
FIG. 4 shows another sensor device for use in the present invention.
Figure 5:
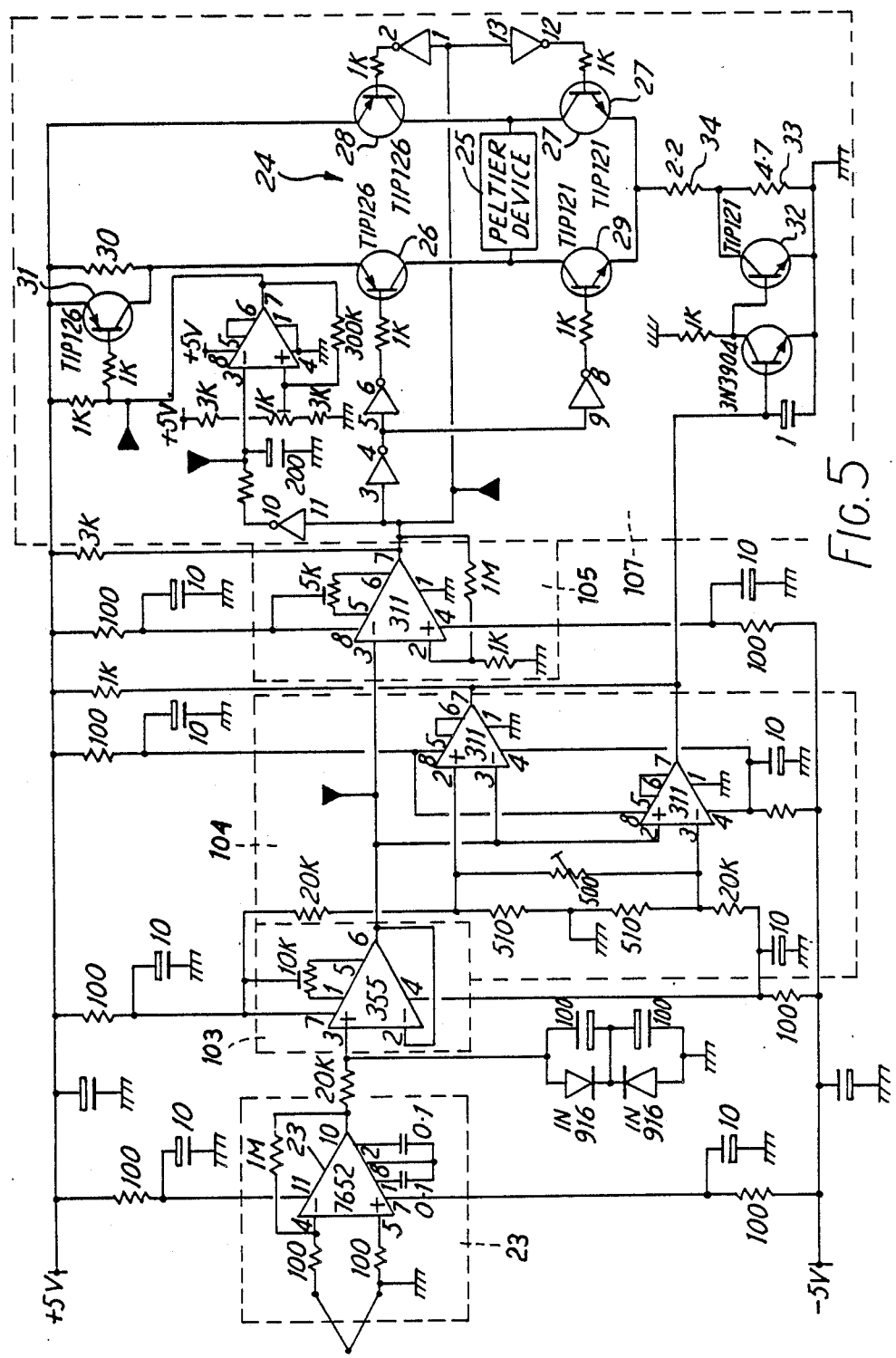
FIG. 5 shows a circuit arrangement for use with the device of FIG. 4.

FIG. 4 shows an alternative sensor device, wherein like parts are labelled with like reference numerals with respect to FIG. 1, and FIG. 5 shows a circuit arrangement suitable for use with the device in FIG. 4 and with like parts labelled with like reference numerals with respect to FIG. 3.

The device in FIG. 4 is surrounded by an insulative housing 50 having a window 2, preferably made of silicon. Inside the housing 50 is a suitable temperature sensor 51, such as a type LM35, embedded in a copper block 52 and having leads 53 to a suitable indicating means (not shown).

The device also includes a thermocouple including 1mm copper wires 54, 55, which are insulated from the block 52, by for example enamelling, but still in good thermal contact therewith. Connected across the two wires 54, 55 is a 1 thousandth of an inch thickness copper foil 56, which is blackened on the side facing the window 2 and is joined at one end to a 2 thousandth of an inch diameter constantan wire 57 and at the other end to a 2 thousandth of an inch diameter chromel wire 58, to provide "hot" junctions H and "cold" junctions C. The thermocouple also has leads 59. The block 52 is in contact with a Peltier device 18 having a heat sink 18a and leads 19, 20.

Figure 6:
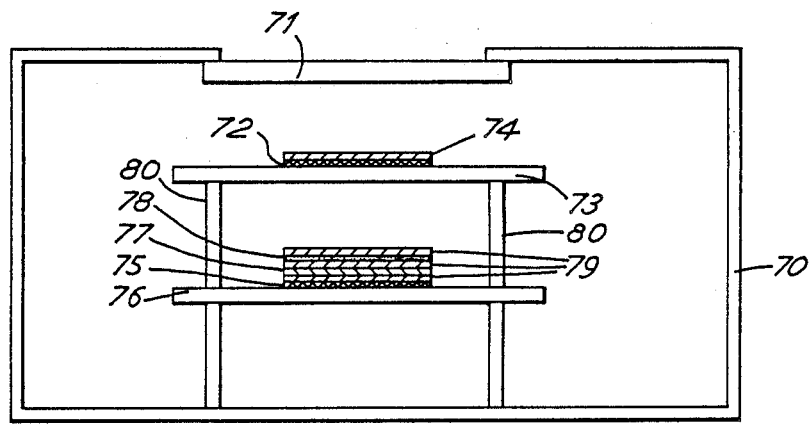
FIG. 6 is a schematic cross-section of another sensor device embodying the present invention.

A sensor embodying the present invention may utilize screen-printing techniques in its structure and the manufacture thereof. Thus as shown by FIG. 6, a housing 70 with a silicon window 71 has a "hot" junction comprising a thermocouple 72 printed onto a ceramic substrate 73 and over-coated with a black insulating layer 74. The "cold" junction comprises a thermocouple 75 printed in similar fashion on a ceramic substrate 76, but with a Peltier 77 cooler/heater and a platinum resistance thermometer 78 printed thereover, appropriate insulating layers 79 being provided. The thermocouples 72 and 75 are connected by thermal links 80 of an appropriate material. The sensor of FIG. 6 can be modified such as to form a planar structure consisting of a single sheet of ceramic with the "hot" and "cold" junctions at each end. Additionally or alternatively, thermopiles may be used in the junctions.

The circuits shown in FIGS. 3 and 5 are only examples and the actual circuit employed may need to be modified to suit the characteristics of the particular sensor device utilised. For example, the time constraints are likely to be shorter for a physically relatively small device, continuous control of the heating/cooling currents rather than stepping between discrete levels may be employed, and an alternative technique for equalising the heating and cooling cycle durations may be employed.

The sensor device can be mounted in any suitable location convenient for cabling, such as into a ceiling. If the device is mounted into a ceiling rose above, for example, a tungsten lamp, the local ambient temperature would be much higher than the average room temperture.

The invention is based on Prevost's law of exchanges, whereby if the room and furniture temperatures are roughly the same and if the sensor housing is at the same temperature as the viewed wall (slightly modified by the temperature of the other surfaces in the room) then the output of the differential temperature sensor would be zero. Those skilled in the art will readily devise alternative ways of implementing the principle of the invention, and it is not intended that the scope of the invention should be limited by the specific embodiments thereof described herein.

It will be appreciated that if a suitable optical and/or mechanical scanning means such as that indicated schematically as 102 in FIG. 1 is incorporated in a temperature sensing arrangement in accordance with the invention, a single arrangement can be used to monitor the temperature of several zones.

I claim:

1. A temperature sensing arrangement including a temperature sensor device incorporating:
   (a) a housing;
   (b) within the housing a reference sensor for monitoring the temperature of the housing;
   (c) also within the housing a further sensor for monitoring the temperature of a zone remote from the housing by means of infra-red radiation emitted by said zone and entering said housing;
   (d) electrically driven control means for controlling the temperature of said housing;
   (e) an electrical circuit arrangement responsive to the output of said reference sensor and said further sensor including means for producing electrical signals effective to drive said electrically driven control means in a sense tending to cause the temperature of said housing to approach that of said zone;
   (f) means for monitoring the temperature of said housing so as to provide an indication of the temperature of said zone; and
   (g) means to vary the drive operation of the electrical circuit arrangement in accordance with the operation of the sensors.

2. A temperature sensing arrangement according to claim 1 adapted to monitor the temperature of each of a plurality of zones remote from the housing, and further comprising optical and/or mechanical scanning means to allow the said further sensor to effect monitoring of successive ones of said plurality of zones.

3. A temperature sensing arrangement according to claim 1 comprising means to monitor the output of the said further sensor to determine if it exceeds a predetermined threshold and means to effect correction of the operation of the electrically driven control means in response to the sensor monitor means.

4. A temperature sensing arrangement according to claim 1 comprising means to render the heating and cooling cycles approximately equal in duration.

5. A temperature sensing arrangement according to claim 1, comprising means to monitor the duration of the heating cycle and the cooling cycle, and means to vary the heating and/or cooling current in response to the cycle-monitor means.

6. A temperature sensing arrangement according to claim 1 wherein the housing includes a silicon window through which infra-red radiation from said zone may enter the housing.

7. A temperature sensing arrangement according to claim 1 wherein the electrically driven control means comprises a Peltier heater/cooler device.

* * * * *